(12) United States Patent
Shih et al.

(10) Patent No.: US 6,409,587 B1
(45) Date of Patent: Jun. 25, 2002

(54) DUAL-HARDNESS POLISHING PAD FOR LINEAR POLISHER AND METHOD FOR FABRICATION

(75) Inventors: Tsu Shih; Syun-Ming Jang, both of Hsin-Chu; Ying-Ho Chen, Taipei; Wen-Chih Chiou, Miao-li, all of (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 0 days.

(21) Appl. No.: 09/713,827

(22) Filed: Nov. 15, 2000

(30) Foreign Application Priority Data

Nov. 16, 1999 (JP) ............................. 11-326188

(51) Int. Cl.[7] .............................. B24D 11/00

(52) U.S. Cl. ................ 451/527; 451/533; 451/299; 451/65

(58) Field of Search ................. 451/527, 533, 451/299, 65, 66, 57

(56) References Cited

U.S. PATENT DOCUMENTS 5,910,043 A * 6/1999 Manzonie et al.

* cited by examiner

Primary Examiner—Timothy V. Eley
Assistant Examiner—Willie Berry, Jr.
(74) Attorney, Agent, or Firm—Tung & Associates

(57) ABSTRACT

A composite, dual-hardness polishing pad for use in a linear chemical mechanical polishing apparatus and a method for forming the pad are described. In the composite, dual-hardness polishing pad, a pad body is first provided which has a leading edge and a trailing edge for mounting to a linear belt immediately adjacent to a second polishing pad. The pad body is fabricated of a material that has a first hardness, the leading edge contacts an object being polished on the composite polishing pad before the trailing edge when the linear belt turns in a linear polishing process. The composite polishing pad further includes a buffer pad that is adhesively joined to the leading edge of the pad body for contacting the object that is being polished, the buffer pad may be fabricated of a material that has a second hardness which is at least 20% smaller than the first hardness such that impact on the object being polished is minimized during a linear polishing process. The present invention is further directed to a method for adhesively joining a buffer pad to a pad body of a polishing pad.

10 Claims, 2 Drawing Sheets

DUAL-HARDNESS POLISHING PAD FOR LINEAR POLISHER AND METHOD FOR FABRICATION

FIELD OF THE INVENTION

The present invention generally relates to a dual-hardness polishing pad for linear polishing and a method for fabrication and more particularly, relates to a dual-hardness polishing pad for use in a linear chemical mechanical polishing process consisting of a body portion formed of a hard material and a cover portion formed of a soft material, and a method for fabrication.

BACKGROUND OF THE INVENTION

In the fabrication of semiconductor devices from a silicon wafer, a variety of semiconductor processing equipment and tools are utilized. One of these processing tools is used for polishing thin, flat semiconductor wafers to obtain a planarized surface. A planarized surface is highly desirable on a shadow trench isolation (STI) layer, on an inter-layer dielectric (ILD) or on an inter-metal dielectric (IMD) layer which are frequently used in memory devices. The planarization process is important since it enables the use of a high resolution lithographic process to fabricate the next level circuit. The accuracy of a high resolution lithographic process can be achieved only when the process is carried out on a substantially flat surface. The planarization process is therefore an important processing step in the fabrication of semiconductor devices.

A global planarization process can be carried out by a technique known as chemical mechanical polishing or CMP. The process has been widely used on ILD or IMD layers in fabricating modern semiconductor devices. A CMP process is performed by using a rotating platen in combination with a pneumatically actuated polishing head. The process is used primarily for polishing the front surface or the device surface of a semiconductor wafer for achieving planarization and for preparation of the next level processing. A wafer is frequently planarized one or more times during a fabrication process in order for the top surface of the wafer to be as flat as possible. A wafer can be polished in a CMP apparatus by being placed on a carrier and pressed face down on a polishing pad covered with a slurry of colloidal silica or aluminum.

A polishing pad used on a rotating platen is typically constructed in two layers overlying a platen with a resilient layer as an outer layer of the pad. The layers are typically made of a polymeric material such as polyurethane and may include a filler for controlling the dimensional stability of the layers. A polishing pad is typically made several times the diameter of a wafer in a conventional rotary CMP, while the wafer is kept off-center on the pad in order to prevent polishing a non-planar surface onto the wafer. The wafer itself is also rotated during the polishing process to prevent polishing a tapered profile onto the wafer surface. The axis or rotation of the wafer and the axis of rotation of the pad are deliberately not collinear, however, the two axes must be parallel. It is known that uniformity in wafer polishing by a CMP process is a function of pressure, velocity and concentration of the slurry used.

A CMP process is frequently used in the planarization of an ILD or IMD layer on a semiconductor device. Such layers are typically formed of a dielectric material. A most popular dielectric material for such usage is silicon oxide. In a process for polishing a dielectric layer, the goal is to remove typography and yet maintain good uniformity across the entire wafer. The amount of the dielectric material removed is normally between about 5000 Å and about 10,000 Å. The uniformity requirement for ILD or IMD polishing is very stringent since non-uniform dielectric films lead to poor lithography and resulting window etching or plug formation difficulties. The CMP process has also been applied to polishing metals, for instance, in tungsten plug formation and in embedded structures. A metal polishing process involves a polishing chemistry that is significantly different than that required for oxide polishing.

The important component needed in a CMP process is an automated rotating polishing platen and a wafer holder, which both exert a pressure on the wafer and rotate the wafer independently of the rotation of the platen. The polishing or the removal of surface layers is accomplished by a polishing slurry consisting mainly of colloidal silica suspended in deionized water or KOH solution. The slurry is frequently fed by an automatic slurry feeding system in order to ensure the uniform wetting of the polishing pad and the proper delivery and recovery of the slurry. For a high volume wafer fabrication process, automated wafer loading/unloading and a cassette handler are also included in a CMP apparatus.

As the name implies, a CMP process executes a microscopic action of polishing by both chemical and mechanical means. While the exact mechanism for material removal of an oxide layer is not known, it is hypothesized that the surface layer of silicon oxide is removed by a series of chemical reactions which involve the formation of hydrogen bonds with the oxide surface of both the wafer and the slurry particles in a hydrogenation reaction; the formation of hydrogen bonds between the wafer and the slurry; the formation of molecular bonds between the wafer and the slurry; and finally, the breaking of the oxide bond with the wafer or the slurry surface when the slurry particle moves away from the wafer surface. It is generally recognized that the CMP polishing process is not a mechanical abrasion process of slurry against a wafer surface.

While the CMP process provides a number of advantages over the traditional mechanical abrasion type polishing process, a serious drawback for the CMP process is the difficulty in controlling polishing rates and different locations on a wafer surface. Since the polishing rate applied to a wafer surface is generally proportional to the relative velocity of the polishing pad, the polishing rate at a specific point on the wafer surface depends on the distance from the axis of rotation. In other words, the polishing rate obtained at the edge portion of the wafer that is closest to the rotational axis of the polishing pad is less than the polishing rate obtained at the opposite edge of the wafer. Even though this is compensated by rotating the wafer surface during the polishing process such that a uniform average polishing rate can be obtained, the wafer surface, in general, is exposed to a variable polishing rate during the CMP process.

More recently, a new chemical mechanical polishing method has been developed in which the polishing pad is not moved in a rotational manner but instead, in a linear manner. It is therefor named as a linear chemical mechanical polishing process in which a polishing pad is moved in a linear manner in relation to a rotating wafer surface. The linear polishing method affords a uniform polishing rate across a wafer surface throughout a planarization process for uniformly removing a film player of the surface of a wafer. One added advantage of the linear CMP system is the simpler construction of the apparatus and therefore not only reducing the cost of the apparatus but also reduces the floor space required in a clean room environment.

A typical linear CMP apparatus 10 is shown in FIGS. 1A and 1B. The linear CMP apparatus 10 is utilized for polishing a semiconductor wafer 24, i.e. a silicon wafer for removing a film layer of either an insulating material or a wafer from the wafer surface. For instance, the film layer to be removed may include insulating materials such as silicon oxide, silicon nitride or spin-on-glass material or a metal layer such as aluminum, copper or tungsten. Various other materials such as metal alloys or semi-conducting materials such as polysilicon may also be removed.

As shown in FIGS. 1A and 1B, the wafer 24 is mounted on a rotating platform, or wafer holder 18 which rotates at a pre-determined speed. The major difference between the linear polisher 10 and a conventional CMP is that a continuous, or endless belt 12 is utilized instead of a rotating polishing pad. The belt 12 moves in a linear manner in respect to the rotational surface of the wafer 24. The linear belt 12 is mounted in a continuous manner over a pair of rollers 14 which are, in turn, driven by a motor means (not shown) at a pre-determined rotational speed. The rotational motion of the rollers 14 is transformed into a linear motion 26 in respect to the surface of the wafer 24. This is shown in FIG. 1B.

In the linear polisher 10, a polishing pad 30 is adhesively joined to the continuous belt 12 on its outer surface that faces the wafer 24. A polishing assembly 40 is thus formed by the continuous belt 12 and the polishing pad 30 glued thereto. As shown in FIG. 1A, a plurality of polishing pads 30 are utilized which are frequently supplied in rectangular-shaped pieces with a pressure sensitive layer coated on the back side.

The wafer platform 18 and the wafer 24 forms an assembly of a wafer carrier 28. The wafer 24 is normally held in position by a mechanical retainer, commonly known as a retaining ring 16, as shown in FIG. 1B. The major function of the retaining ring 16 is to fix the wafer in position in the wafer carrier 28 during the linear polishing process and thus preventing the wafer from moving horizontally as wafer 24 contacts the polishing pad 30. The wafer carrier 28 is normally operated in a rotational mode such that a more uniform polishing on wafer 24 can be achieved. To further improve the uniformity of linear polishing, a support housing 32 is utilized to provide support to support platen 22 during a polishing process. The support platen 22 provides a supporting platform for the underside of the continuous belt 12 to ensure that the polishing pad 30 makes sufficient contact with the surface of wafer 24 in order to achieve more uniform removal in the surface layer. Typically, the wafer carrier 28 is pressed downwardly against the continuous belt 12 and the polishing pad 30 at a predetermined force such that a suitable polishing rate on the surface of wafer 24 can be obtained. A desirable polishing rate on the wafer surface can therefore by obtained by suitably adjusting forces on the support housing 32, the wafer carrier 28, and the linear speed 26 of the polishing pad 30. A slurry dispenser 20 is further utilized to dispense a slurry solution 34.

In the conventional linear polisher 10, the polishing pads 30 are joined to the continuous belt 12 by adhesive means such as by a pressure sensitive. In a typical linear polisher, since the continuous belt 12 may have a length of about 240 cm, while the polishing pads 30 cannot be supplied in the form of a continuous manner, many pieces of the polishing pads 30 must be used. In other words, seam lines between adjacent polishing pads 30 must be formed when joined to the continuous belt 12. For instance, when the polishing pads are supplied in length of only about 30~40 cm, between five and seven pieces of the polishing pads must be utilized.

The linear chemical mechanical polishing method provides the advantages of a high belt speed, a low compression force on the sample and the flexibility of using either a hard pad or a soft pad. However, the seam lines discussed above frequently cause problems for a semiconductor wafer that is being polished in the linear polishing process. For instance, as shown in FIG. 2, the polishing pads 30 are adhesively bonded to the linear belt 12 which is made of stainless steel and stretched in a highly tensioned state, i.e. stretched over the rollers 14. It is impossible to have a tight seam or joint between adjacent polishing pads 30. Instead, a gap "1" is frequently formed between the polishing pads. The gap "1" may have a magnitude between about 1 mm and about 5 mm.

Furthermore, since the polishing pad 30 is normally formed of a hard pad material, i.e. having a Durometer A hardness of at least 60, the edge 40 of the polishing pad 30 may have a rough edge due to the cutting process in which the pads are trimmed to size. The rough edge exists regardless of whether the pad is cut at 90° angle or at 45° angle to the length of the pad.

During the linear polishing process, the wafer platform 18 presses wafer 24 onto the polishing pad 30 under a predetermined compressing force. Both the flexibility of the polishing pad 30 and the flexibility of the linear belt 12 allows the top surface of the wafer 24 to be pushed below the top surface of the polishing pad 30. As a result, as the rollers 14 are turned to move linearly the belt 12 and the polishing pad 30 mounted thereon, a front edge (or leading edge) 40 of the polishing pad 30 constantly collides with the front edge of the wafer 24. Such collision or impact on the wafer edge by the leading edge 40 of the polishing pad 30 causes a delamination or peling of the coating layers on the wafer surface. For instance, this type of polishing defect has been known to occur in wafers that have low-k oxide film layers deposited on top. The peeling or delamination of the low-k oxide films from the wafer surface at the wafer edge severely affects the yield of the fabrication process. The defect must therefore be minimized or prevented altogether.

It is therefore an object of the present invention to provide a composite polishing pad for use in a linear polishing process that does not have the drawbacks or shortcomings of the conventional polishing pads.

It is another object of the present invention to provide a composite polishing pad for use in a linear polishing process that does not cause film peeling or delamination from a wafer surface that is being polished.

It is a further object of the present invention to provide a composite polishing pad for use in a linear polishing process in which the composite polishing pad is constructed of a hard pad material with a soft pad laminated thereon.

It is another further object of the present invention to provide a dual-hardness polishing pad for use in a linear polishing process in which a pad body is formed of a material that has a first hardness, and a pad cover is formed of a material that has a second hardness which is at least 20% lower than the first hardness.

It is still another object of the present invention to provide a dual-hardness polishing pad for use in a linear chemical mechanical polishing process in which a soft pad material is used to cover a leading edge of a polishing pad made of a hard pad material.

It is yet another object of the present invention to provide a dual-hardness polishing pad for use in a linear chemical mechanical polishing process in which a pad body is formed of a first material having a Durometer A hardness of at least 60, which is coated on a leading edge by a pad material of a second hardness that is at least 20% lower than the first hardness.

It is still another further object of the present invention to provide a method for forming a dual-hardness polishing pad for use in a linear polisher by first forming a body portion of the pad in a hard pad material and then covering a leading edge of the body portion with a soft pad material.

It is yet another further object of the present invention to provide a method for forming a dual-hardness polishing pad for use in a linear polisher by first providing a body portion made of a material that has a Durometer A hardness of at least 60, and then coating a leading edge of the body portion with a second material that has a Durometer A hardness of less than 50.

SUMMARY OF THE INVENTION

In accordance with the present invention, a composite, dual-hardness polishing pad for use in a linear chemical mechanical polishing process and a method for forming the pad are provided.

In a preferred embodiment, a composite polishing pad for linear polishing is provided which includes a pad body that has a leading edge and a trailing edge for mounting to a linear belt immediately adjacent to a second polishing pad. The pad body is fabricated of a material that has a first hardness, the leading edge contacts an object being polished on the composite polishing pad before the trailing edge when the linear belt turns in a linear polishing process, and a buffer pad adhesively joined to the leading edge of the pad body for contacting the object that is being polished, the buffer pad is fabricated of a material that has a second hardness which is at least 20% lower than the first hardness such that impact on the object is minimized during a linear polishing process.

In the composite polishing pad for linear polishing, the pad body is mounted to the linear belt immediately adjacent to the second polishing pad with a space of at least 1 mm therein-between. The pad body may be mounted to the linear belt by adhesive means, and may be fabricated of a material that has a Durometer A hardness not lower than 60. The buffer pad may be fabricated of a material that has a Durometer A hardness not higher than 50. The buffer pad adhesively joins and covers both a horizontal top surface and a vertical side surface of the leading edge of the pad body.

The present invention is further directed to a dual-hardness polishing pad for use in linear chemical mechanical polishing which includes a body portion formed of a first material that has a first hardness, the body portion has a leading edge and a trailing edge and when mounted to a linear belt and rotated during a linear polishing process, the leading edge contacts an object being polished first before the trailing edge; and a cover portion formed of a second material that has a second hardness which is at least 20% lower than the first hardness, the cover portion substantially covers the leading edge of the body portion such that impact on the object being polished can be minimized during a linear polishing process.

In the dual-hardness polishing pad for use in linear chemical mechanical polishing, the body portion and the cover portion of the polishing pad are formed of a polymeric material. The first material may have a Durometer A hardness of not lower than 60, while the second material may have a Durometer A hardness of not higher than 50. The dual-hardness polishing pad is mounted to a linear belt juxtaposed to a second dual-hardness polishing pad with a spacing of at least 1 mm therein-between. The cover portion substantially covers the leading edge of the body portion on both a horizontal top surface and on a vertical side surface.

The present invention is still further directed to a method for forming a dual-hardness polishing pad for use in a linear polisher which includes the operating steps of first providing a body portion that has a leading edge and a trailing edge, the body portion being formed of a material that has a first hardness; then providing a cover portion that has a contour for intimately joining the leading edge of the body portion, the cover portion being formed of a material that has a second hardness that is at least 20% lower than the first hardness; and joining the cover portion to the body portion forming the dual-hardness polishing pad.

The method for forming a dual-hardness polishing pad for use in a linear polisher may further include the step of joining the cover portion to the body portion by adhesive means, or the step of forming the body portion with a material that has a Durometer A hardness of at least 60, or the step of forming the cover portion with a material that has a Durometer A hardness of not higher than 50. The method may further include the step of joining the cover portion to the body portion by substantially covering both a horizontal top surface and a vertical side surface of the body portion.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses a polishing pad for use in a linear polisher that does not cause wafer edge peeling problems when polishing a semiconductor wafer. While the present invention polishing pad can be used in any type of linear polisher, it is particularly suitable for use in a linear chemical mechanical polishing apparatus.

The composite, or dual-hardness polishing pad, of the present invention for use in a linear polisher without causing wafer edge peeling defect can be constructed by a pad body that is fabricated of a material which has a first hardness, the pad body is equipped with a leading edge and a trailing edge for mounting to a linear belt adjacent to a second polishing pad, wherein the leading edge contacts an object being polished on the composite polishing pad before the trailing edge when the linear belt turns in a linear polishing process. The composite polishing pad further includes a buffer pad that is adhesively joined to the leading edge of the pad body for contacting the object that is being polished, the buffer pad may be fabricated of a material that has a second hardness which is at least 20% lower than the first hardness such that impact on the object is minimized during a linear polishing process. The pad body is normally mounted to the linear belt immediately adjacent to a second polishing pad with a space of at least 1 mm, or a space between about 1 mm and about 5 mm therein-between.

The invention further provides a dual-hardness polishing pad for use in a linear chemical mechanical polishing process in which a body portion is formed of a first material that has a Durometer A hardness of not lower than 60, and a cover portion that is formed of a second material which has a Durometer A hardness that is not higher than 50. The cover portion is adhesively joined to the body portion covering substantially a leading edge of the body portion for contacting an object being polished when the polishing pad is moved against the object. The body portion and the cover portion of the polishing pad may be fabricated of a polymeric material.

The invention further provides a method for fabricating a dual-hardness polishing pad for use in a linear chemical mechanical polishing apparatus which can be carried out by first providing a body portion that has a leading edge and a trailing edge, the body portion is formed of a material that has a Durometer A hardness of not lower than 60. A cover portion is then provided which has a contour for intimately joining to the leading edge of the body portion, the cover portion may be formed of a material that has a Durometer A hardness of not higher than 50. The body portion and the cover portion are then joined together by adhesive means forming a dual-hardness polishing pad.

Figure 1A:
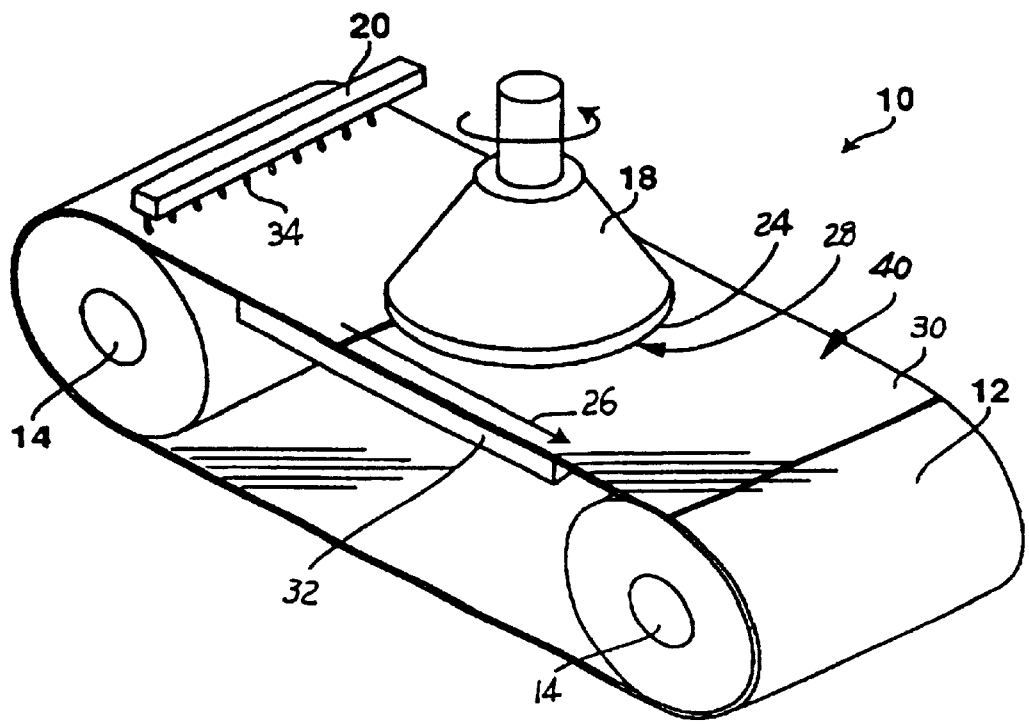
FIG. 1A is a perspective view of a conventional linear chemical mechanical polishing apparatus utilizing a continuous belt.
Figure 1B:
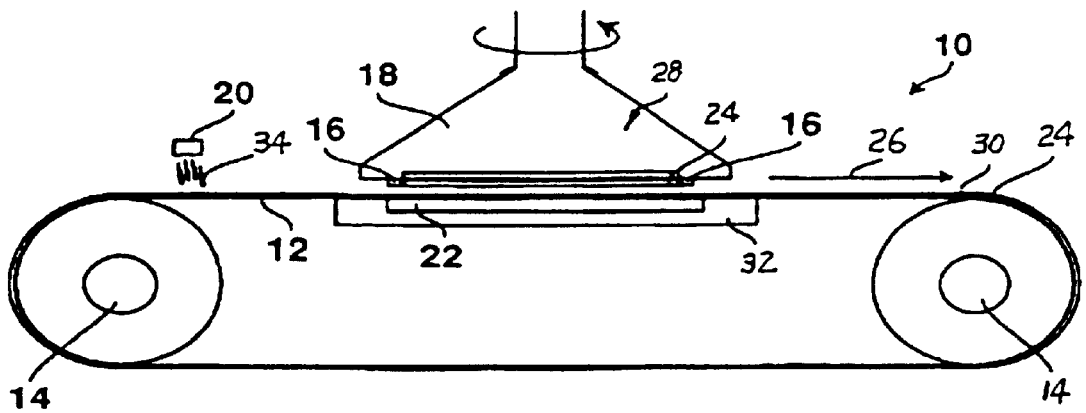
FIG. 1B is a side view of the conventional linear chemical mechanical polishing apparatus of FIG. 1A.
Figure 2:
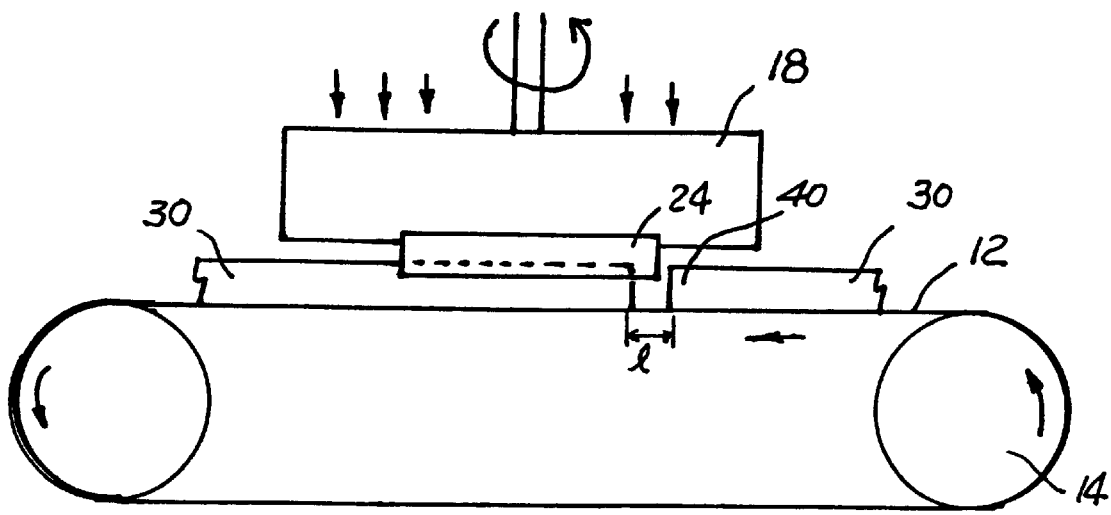
FIG. 2 is a side view of the conventional linear chemical mechanical polishing apparatus of FIG. 1A illustrating the compression of a polishing pad by the wafer and the collision of a wafer with a leading edge of the polishing pad.
Figure 3:
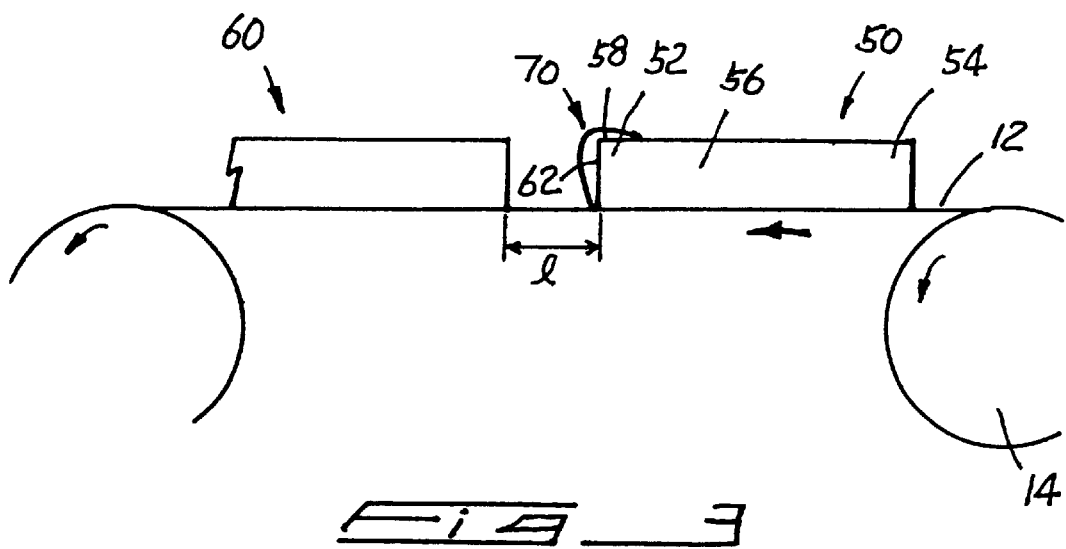
FIG. 3 is a partial, cross-sectional view of a present invention dual-hardness polishing pad formed with a soft buffer pad laminated on top of a leading edge of a hard pad.

Referring now to FIG. 3, wherein a present invention polishing pad 50 is shown. The polishing pad 50 is adhesively jointed to a linear belt 12 and is immediately adjacent to a second polishing pad 60 also mounted on the linear belt 12. A gap "1" is normally formed between the polishing pads 50 and 60 which is in the range of between about 1 mm and about 5 mm. The gap "1" is partially caused by the fact that the linear belt 12, frequently fabricated of stainless steel, is under high tension when stretched over the rollers 14. The polishing pad 50 has a leading edge 52 and a trailing edge 54. The leading edge 52 is a rough edge since the polishing pad 50 is formed by mechanical trimming the pad to a suitable dimension. The rough edge 52 tends to cut into upon impacting an edge of a wafer during a linear polishing process. As previously discussed, one example of the wafer edge peeling or delamination problem has been observed in wafers that are coated with low-k oxide films on top.

The present invention novel method assembles, preferably by adhesive means, a buffer pad 70, that is made of a softer material, i.e., a Durometer A hardness of less than 50 to a pad body. It is soft when compared to the material in the body portion 56 of the polishing pad 50 which has a Durometer hardness of normally higher than 60. A suitable means for joining the buffer pad 70 to the body portion 56 of the polishing pad 50 is by adhesive means, for instance, by an epoxy type adhesive that can be thermally cured to form a permanent bond.

It should be noted that the shape of the buffer pad 70 should be preferably that shown in FIG. 3, i.e. that it covers both a horizontal top surface and a vertical side surface. As shown in FIG. 3, both the top surface 58 and the side surface 62 are covered by the buffer pad 70. When the linear belt 12 is advanced in the direction as marked in FIG. 3, the buffer pad 70 comes in contact first with a semiconductor wafer, i.e. or with the edge of a semiconductor wafer. Since the buffer pad 70 is formed of a softer material, i.e. generally at least 20% lower in Durometer than the hard material used for forming the body portion 56 of the polishing pad 50, any possible wafer edge peeling or delamination problem can be minimized or avoided.

The present invention novel composite, dual-hardness polishing pad for use in a linear chemical mechanical polishing apparatus and a method for forming the pad have therefore been amply described in the above description and in the appended drawing of FIG. 3.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows.

What is claimed is:

1. A composite polishing pad for linear polishing comprising:

a pad body having a leading edge and a trailing edge for mounting to a linear belt immediately adjacent to a second polishing pad, said pad body being fabricated of a material having a first hardness, said leading edge contacts an object being polished on said composite polishing pad before said trailing edge when said linear belt turns in a linear polishing process; and a buffer pad adhesively joined to said leading edge of said pad body for contacting said object that is being polished, said buffer pad being fabricated of a material having a second hardness that is at least 20% smaller than said first hardness such that impact on said object is minimized during a linear polishing process, said buffer pad adhesively joins and covers both a horizontal top surface and a vertical side surface of said leading edge of said pad body.

2. A composite polishing pad for linear polishing according to claim 1, wherein said pad body being mounted to said linear belt immediately adjacent to said second polishing pad with a spacing of at least 1 mm therein between.

3. A composite polishing pad for linear polishing according to claim 1, wherein said pad body being mounted to said linear belt by adhesive means.

4. A composite polishing pad for linear polishing according to claim 1, wherein said pad body being fabricated of a material having a Durometer A hardness not lower than 60.

5. A composite polishing pad for linear polishing according to claim 1, wherein said buffer pad being fabricated of a material having a Durometer A hardness not higher than 50.

6. A dual-hardness polishing pad for use in linear chemical mechanical polishing comprising:

a body portion formed of a first material having a first hardness, said body portion having a leading edge and a trailing edge and when mounted to a linear belt and rotated during a linear polishing process, said leading edge contacts an object being polished first before said trailing edge; and a cover portion formed of a second material having a second hardness that is at least 20% smaller than said first hardness, said cover portion substantially covers said leading edge of said body portion on both a horizontal top surface and a vertical side surface such that impact on said object being polished is minimized during a linear polishing process.

7. A dual-hardness polishing pad for use in linear chemical mechanical polishing according to claim 6, wherein said body portion and said cover portion of said polishing pad are formed of a polymeric material.

8. A dual-hardness polishing pad for use in linear chemical mechanical polishing according to claim 6, wherein said first material has a Durometer A hardness of not lower than 60.

9. A dual-hardness polishing pad for use in linear chemical mechanical polishing according to claim 6, wherein said second material has a Durometer A hardness of not higher than 50.

10. A dual-hardness polishing pad for use in linear chemical mechanical polishing according to claim 6, wherein said dual-hardness polishing pad being mounted to a linear belt juxtaposed to a second dual-hardness polishing pad with a spacing of at least 1 mm therein between.

* * * * *